United States Patent [19]

Burt et al.

[11] E Patent Number: Re. 32,997

[45] Reissued Date of Patent: Jul. 25, 1989

[54] ELECTRIC CONTROL VALVE

[75] Inventors: David L. Burt, Grosse Pointe; Gregory J. Krawczyk, Royal Oak, both of Mich.

[73] Assignee: Allied-Signal Inc., Morris Township, Morris County, N.J.

[21] Appl. No.: 829,375

[22] Filed: Feb. 13, 1986

Related U.S. Patent Documents

Reissue of:

[64] Patent No.: 4,431,160
Issued: Feb. 14, 1984
Appl. No.: 364,815
Filed: Apr. 2, 1982

[51] Int. Cl.[4] ..... F16K 25/00

[52] U.S. Cl. ..... 251/86; 251/129.19

[58] Field of Search ..... 251/85, 86, 88, 129.19

[56] References Cited

U.S. PATENT DOCUMENTS

| | | | |
|---|---|---|---|
| 783,528 | 2/1905 | Kipp | 251/86 |
| 1,626,532 | 4/1927 | Hehemann | 251/88 |
| 2,698,159 | 12/1954 | Crum | 251/129.19 |
| 3,482,596 | 12/1969 | Jones | 251/88 |
| 4,114,850 | 9/1978 | Alamprese | 251/88 |
| 4,300,595 | 11/1981 | Mayer et al. . | |

FOREIGN PATENT DOCUMENTS

| | | | |
|---|---|---|---|
| 932063 | 5/1982 | U.S.S.R. | 251/129.19 |
| 2008228 | 5/1979 | United Kingdom . | |
| 2080415 | 2/1982 | United Kingdom . | |

*Primary Examiner*—Stephen Hepperle
*Attorney, Agent, or Firm*—Markell Seitzman

[57] ABSTRACT

An electrically operated control valve adapted to fit within a bore of a cooperating apparatus. The valve including an interchangeable stator and lower body member. The valve further includes a valve means having a swingable self-aligning valve closure element.

8 Claims, 1 Drawing Sheet

ELECTRIC CONTROL VALVE

Matter enclosed in heavy brackets [ ] appears in the original patent but forms no part of this reissue specification; matter printed in italics indicates the additions made by reissue.

The invention relates to electrically controlled two-way valves for controlling the admission of fuel through an adjacent passage and more particularly to a valve that contains a self-aligning closure element.

As mentioned, the present invention relates to an electrically controlled valve. The valve has wide ranging applicability, however a specific application of the present valve is to control the flow of fuel into a timing chamber of an electrically controlled unit injector having a single solenoid control valve. Such a unit injector is shown in the commonly assigned U.S. patent to Sisson et al., U.S. Pat. No. 4,281,792, which issued Aug. 4, 1981. To control the operation of such a unit injector, the control valve must be able to fit into a small envelope and be able to provide an effective seal against the pressure adjacent to its outflow passage, which may be as high as 20,000 psi (1400 bars) while permitting a minimum amount of leakage. To meet the first requirement imposed, the present invention advantageously eliminates the exterior housing which is often used to retain the electro-mechanical elements of similar valves. As illustrated below, the present invention comprises a separate stator and lower body member that are fitted to a cooperating bore leading to a pressure chamber of an apparatus such as the above-noted unit injector. In this respect, an advantage of the present invention is that the stator and lower body member are completely interchangeable therein permitting easy replacement or interchangeability to meet varying operational demands. A further advantage of the present invention is the ability to seal against high pressure while permitting a minimum leakage. This is advantageously achieved by incorporating within the lower body member a self-aligning face. The self-aligning valve face includes means to permit the valve face to rotate relative to its coacting valve seat thus permitting the control valve to compensate for misalignments of the various valve components. This feature permits the valve face to rotate about a valve cap. Consequently, the only tolerances which are significant in controlling the leakage through the valve are the flatness of the sealing surfaces. A further advantage of the present invention is that the fluid flow is directed through the lower body member to thereby cool the valve. In addition, the actuation distance or gap as described below can be mechanically set rather than determined by the tolerances of the cooperating parts.

Accordingly, the present invention comprises a two piece control valve adapted to be received within a bore of a cooperating apparatus. The control valve comprising: a stator and a lower body member positioned adjacent to the stator. The lower body member includes a plurality of passages such as an axially extending bore.

The valve further includes armature means including a magnetic member and a piston member reciprocable within the axially extending bore and valve means and movable with the armature in response to the magnetic field generated by the stator for restricting the outflow of fuel therefrom.

The valve means includes a movable valve closure element having a valve face and a stationary member defining a valve seat.

The valve means further including self aligning means to permit the valve face to align with and seal upon the valve seat; this self-aligning means comprising: a nut having a spherically shaped upper surface. The nut is secured to an end of the piston member that extends from said lower body member. The self-aligning means further includes a cup-shaped valve cap having walls, the end of which define the valve face and a bottom having an opening therethrough. The bottom includes a lower surface having a conical shape and a spherically shaped upper surface. The opening in the bottom being adapted to permit the valve cap to be mounted onto the extending portion of the piston member; the self-aligning means further including a preload spacer having an upper surface and a bottom surface and a centrally located opening adapted to receive the piston member, the bottom of the preload spacer having a conically shaped surface that is positioned in contacting engagement with the upper surface of the valve cap, and spring means for biasing the upper surface of the preload spacer towards an open condition.

DETAILED DESCRIPTION OF THE DRAWINGS

Figure 1:
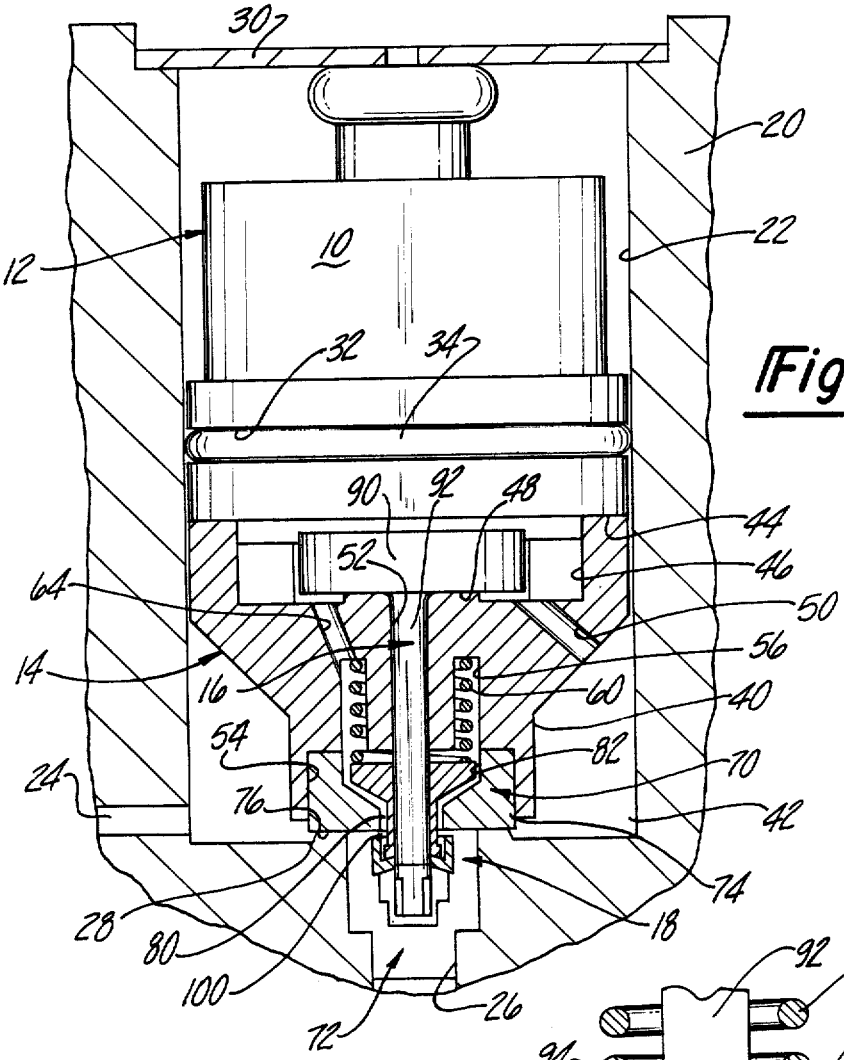
FIG. 1 is a schematic diagram illustrating a cross-sectional view of the present invention.

Reference is now made to FIG. 1 which illustrates the control valve 10 comprising a stator 12 and a lower body member 14. The lower body member houses an armature assembly 16 and valve means 18. The two piece control valve 10 is received within a bore 22 of a coacting apparatus or housing that is generally designated 20. As previously mentioned, the apparatus may be a unit injector similar to that described in the U.S. Pat. No. 4,281,792, which is expressly incorporated by reference. The apparatus or injector would include a supply or first passage 24 that terminates in the lower end of the bore 22 and an outflow or second passage 26 that communicates with a pressure or timing chamber (not shown). It is not a requirement of the invention that the stator 12 be completely received within the bore 22. The lower body member 14 is seated upon a shoulder 28. The control valve 10 is maintained in a fastened orientation within the housing 20 by means of a clamp 30. Alternatively the clamp 30 can be eliminated by substituting a threadable connection between the stator 12 and bore 22.

Returning to the discussion of the control valve 10. The control valve 10 comprises a stator 12 of a known construction and magnetically sized to produce a desired magnetic flux upon actuation. The stator 12 may also include an annular groove 32 and O-ring 34 that is adapted to be biased against the walls of the bore 22. The lower body member 14 comprises a truncated exterior wall 40 that defines in cooperation with the lower portion of bore 22, a fuel chamber 42. The lower body member 14 further includes an upper surface 44, adapted to engage a mating surface of the stator 12. A partially extending first bore 46 is fabricated within the upper surface 44. This bore serves as an enclosure for the armature assembly 16. The bottom surface of the bore 46 may further include an upraised boss 48. The bore 46 may be formed by a separate washer-like spacer member (not shown). The first bore 46 is communicated to the wall 40 (and to the fuel chamber 42) by a fuel passage 50. The lower body member 14 further includes an axially extending second bore 54 and are inwardly extending third bore 52 oppositely situated from the first surface 44. The lower portion of the first bore 46 is also communicated with the upper portion of an axially extending spring chamber of annular bore 56. The annular bore 56 comprises a spring chamber to house a bias spring 60. The annular bore 56 is preferably coaxial to the third bore 52. Fluid communication is achieved between the first bore 46 and the annular bore or spring chamber 56 via a fuel passage 64.

The control valve 10 further includes valve means 18. The valve means 18 includes a valve seat 70 and a valve closure element 72. The valve seat 70 comprises a member 74 that is adapted to fit within the bore 54, having an outwardly positioned surface 76 and a bore 80 extending therethrough. The bore 80 terminates in a larger oppositely situated valve bore 82 which is the upper portion of the bore 80. It is required, however, that the bore 82 communicate the spring chamber 56 with the bore 80. The valve closure element 72 is movable with the armature assembly 16. The armature assembly 16 comprises a magnetically responsive magnetic member 90 and an axially extending piston member 92. The piston member 92 is positioned within and extends through the axially extending bore 52 and through the bore 80 in the valve seat 70. The valve closure element 72 is connected to that portion of the piston member 92 extending beyond the valve seat 70.

Figure 2:
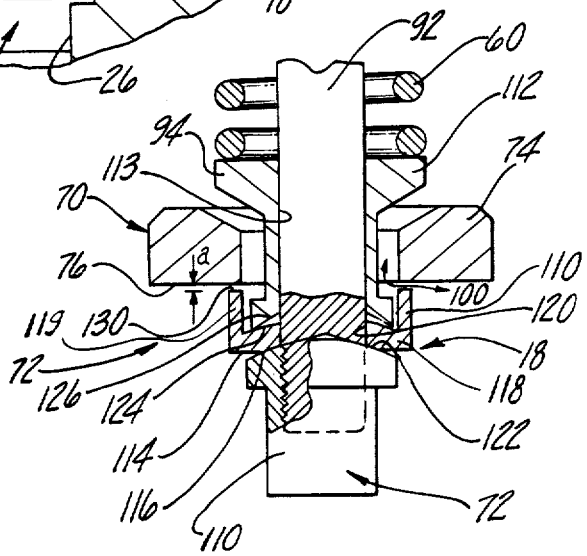
FIG. 2 further illustrates the details of the self-aligning closure element shown in FIG. 1.

Reference is now made to FIG. 2 which illustrates in greater detail, the structure of the valve means 18. As previously mentioned, the valve means 18 comprises a valve seat 70 and the valve closure element 72. The valve closure element 72 is connected to the piston member 92. The closure element 72 is movable with the piston member 92 for seating upon the outer surface 76 of the member 74. The valve closure element 72 includes a nut 110 threadably attached to the piston member 92, a preload spacer 112 and an intermediate hollow cup-shaped cap 114 having a sealing face 130. The preload spacer 112 includes an opening 113 that is adapted to receive the piston member 92. One end of the preload spacer 112 extends out through the bore 80 while the other end of the preload spacer extends into the volume formed by the valve bore 82. The spring 60 is maintained in contacting engagement with the preload spacer 112 for biasing the valve closure element 72 apart from the seating surface 76 thereby creating a flow path 100. To accommodate for the situation, where the axis of the piston member 92 and the axis of the bore 52 are skewed relative to one another or to accomodate for the lack of perpendicularity between the surface 76 of member 74 and the axis of the piston member 92, the valve closure element 72 further includes self-aligning means for permitting the valve closure element 72 to effectively seal upon surface 76 of the valve seat 70. In the preferred embodiment of the invention, the self-aligning means includes the nut 110 attached to the lower end of the piston member 92. The nut 110 includes an upper spherically shaped surface 116. The self-aligning means further includes the hollow cup-shaped cap 114 that is rotatably and slidably situated between the preload spacer 112 and the nut 110. The cup-shaped cap 114, a bottom 118 having an opening 120 and a lower conically shaped surface 122 which provides a line contact with the spherical surface 116 of the nut 110. The bottom 118 of the cap 114 further includes an upper surface 124 having a spherical contour and a wall 119 axially extending from the bottom 118. In the preferred embodiment of the invention, the center of the spherical surface 116 and the center of the upper surface 124 are the same. Finally, the lower surface 126 of the preload spacer 112, engaging the upper surface 124 is fabricated to have a conical shape therein providing a line contact therebetween. The end surface or valve face 130 of wall 119 of the valve cap 114 is machined to a desired flatness to conform to and seat with the surface 76.

FIG. 1 illustrates the control valve 10 in its open condition wherein the fuel is received into the fuel chamber 42 from the fuel passage 24. Fuel is communicated to the first bore 46 through the fuel passage 50. The fuel envelopes the magnetic member 90 and flows into the spring chamber 56 through the fuel passage 64. Fuel is communicated through the bores 82 and 80 and flows out of the valve through the flow path 100 and into the outflow or second passage 26 of the cooperating apparatus 20. Upon receipt of an electrical command signal, a magnetic force is created to move the member 90 through its stroke generally designated as 'a'. The movement of the member 90 causes the valve means 18 to seat upon the surface 76 of member 74 therein terminating fuel flow. It is anticipated that the top surface 116 of the nut 110 will be machined with a spherical surface. This spherical surface, in conjunction with the chamfered or conically shaped lower surface 122 of the bottom 118 of the valve cap 114 will permit the valve face 130 to be free to rotate. The mating surface between the sufaces 116 and 122 will be a circular contact area which may tend to yield slightly when the valve means 18 is closed to provide an effective seal. The ability of the valve face 130 to rotate relative to the nut 110 will allow the valve face 130 to align itself against the valve seat 70. Consequently as previously mentioned, the only tolerances which will affect the leakage will be the flatness of the two sealing areas, i.e., 76 and 130. Finally, as previously mentioned, the upper surface 124 of the valve cap 114 is preferably machined with a spherical radius which will mate with the chamfered conical shaped lower surface 126 of the preload spacer 112. The contact surface between the surfaces 124 and 126 will be a circular contact area which will provide the valve face 130 with stability in the aligned position when the valve is open.

Many changes and modifications in the above described embodiment of the invention can of course be carried out without department from the scope thereof. Accordingly, that scope is intended to be limited only by the scope of the appended claims.

What is claimed is:

1. A two piece control valve adapted to be received within a bore of a cooperating apparatus, the control valve comprising:

a stator;

a lower body member positioned adjacent to said stator including a plurality of passages including an axially extending bore;

armature means including a magnetic member and a piston member reciprocable within said axially extending bore and situated within the said lower body member;

valve means, movable with said armature means in response to the magnetic field generated by said stator for permitting the outflow of fuel therefrom;

said valve means partially situated within said lower body member and including a movable valve closure element having a valve face and a stationary member defining a valve seat;

said valve means further including self aligning means to permit said valve face to align with and seal upon said valve seat;

said self-aligning means comprising:

a nut having a spherically shaped upper surface and secured to an end of said piston member extending from said lower body member;

a cup-shaped valve having walls the end of which define said valve face and a bottom having an opening therethrough, said bottom including a lower surface having a conically shaped surface and a spherically shaped upper surface, said opening adapted to permit said valve cap to be mounted onto the said extending portion of said piston member;

said self-aligning means further including a preload spacer having an upper surface and a bottom surface and a centrally located opening adapted to receive said piston member, said bottom of said preload spacer having a conically shaped lower surface and positioned in contacting engagement with said upper surface of said valve cap; and spring means for biasing said upper surface of said preload spacer towards an open condition.

*2. A control valve adapted to be received within a bore of a cooperating apparatus, the control valve comprising:*

*a lower body member comprising a plurality of passages including a axially extending bore;*

*armature means including a magnetic member movable in response to a magnetic field and a piston member movable therewith, reciprocable within said axially extending bore and situated within said lower body member;*

*a valve seat positioned about one of said plurality of passages;*

*valve means, movable with said armature means for permitting the flow of fluid through said passage, and partially situated within said lower body member and including self-aligning means for aligning with and seating upon said valve seat;*

*said self-aligning means comprising:*

*a nut having a spherically shaped upper surface and secured to an end of said piston member extending from said lower body member;*

*a movable closure element comprising: walls the end of which define a valve face and a bottom having an opening therethrough, said bottom including a conically shaped lower surface adapted to engage said upper surface of said nut and a spherically shaped upper surface, said opening adapted to permit said closure element to be mounted onto said piston member;*

*said self-aligning means further including a preload spacer having an upper surface and a bottom surface and a centrally located opening adapted to receive said piston member, said bottom of said preload spacer having a conically shaped lower surface and positionable in contacting engagement with said upper surface of said closure element; and*

*spring means for biasing said upper surface of said preloas spacer towards an open condition.*

*3. The valve as defined on claim 2 wherein said magnetic field is generated by a stator.*

*4. A control valve comprising;*

*an electromagnetically actuated armature movable relative to a flow passage;*

*a valve seat disposed about said flow passage;*

*valve means situated in said flow passage comprising a valve closure element, including a valve face, movable with said armature and further including self-aligning means for permitting said valve face to align with and seal upon said valve seat wherein said self-aligning means comprises:*

*a first member having a spherically shaped upper surface secured to an extending portion of said armature;*

*a cup-shaped valve cap having walls the end of which define said valve face and a bottom having an opening therethrough, said bottom including a conically shaped lower surface in contacting engagement with the upper surface of said first member and a spherically shaped upper surface, said opening adapted to permit said valve cap to receive said extending portion of said armature;*

*said self-aligning means further including a preload spacer having an upper surface and a bottom surface and a centrally located opening adapted to receive said extending portion, said bottom of said preload spacer having a conically shaped lower surface and positioned in contacting engagement with said upper surface of said valve cap.*

*5. The control valve as defined in claim 4 further including means for biasing said valve closure element in an open condition.*

*6. The control valve as defined in claim 5 wherein said biasing means includes:*

*a spring for biasing said upper surface of said preload spacer towards an open condition.*

*7. The control valve as defined in claim 4 wherein said first member comprises a nut received upon said extending portion.*

*8. The control valve as defined in claim 7 wherein said armature includes a magnetically attractable portion situated in an extension of said flow passage and a piston member depending therefrom, said piston member defining the extending portion of said armature.*

* * * * *